(12) United States Patent
Rosset et al.

(10) Patent No.: US 9,503,523 B2
(45) Date of Patent: Nov. 22, 2016

(54) HYBRID FIBRE CHANNEL STORAGE WITH END-TO-END STORAGE PROVISIONING AND EXTERNAL CONNECTIVITY IN A STORAGE AREA NETWORK ENVIRONMENT

(71) Applicant: Cisco Technology, Inc., San Jose, CA (US)

(72) Inventors: Sebastien T. Rosset, Sunnyvale, CA (US); Suresh Kumar Kewalram, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 370 days.

(21) Appl. No.: 14/033,361

(22) Filed: Sep. 20, 2013

(65) Prior Publication Data

US 2015/0089015 A1 Mar. 26, 2015

(51) Int. Cl.
*G06F 15/16* (2006.01)
*H04L 29/08* (2006.01)

(52) U.S. Cl.
CPC ................................ *H04L 67/1097* (2013.01)

(58) Field of Classification Search
CPC .................................................. H04L 67/1097
USPC ........................................................ 709/215
See application file for complete search history.

(56) References Cited

U.S. PATENT DOCUMENTS

| | | | |
|---|---|---|---|
| 5,812,950 A | 9/1998 | Tom | |
| 5,838,970 A | 11/1998 | Thomas | |
| 6,976,090 B2 | 12/2005 | Ben-Shaul et al. | |
| 7,500,053 B1 | 3/2009 | Kavuri | |
| 7,697,554 B1 | 4/2010 | Ofer et al. | |
| 7,706,303 B2 | 4/2010 | Bose et al. | |
| 7,757,059 B1 | 7/2010 | Ofer et al. | |
| 7,793,138 B2 | 9/2010 | Rastogi et al. | |
| 7,843,906 B1 | 11/2010 | Chidambaram et al. | |
| 7,904,599 B1 | 3/2011 | Bennett | |
| 7,930,494 B1 | 4/2011 | Goheer et al. | |

(Continued)

OTHER PUBLICATIONS

Inside Cisco Systems' Unified Computing System by Marc Staimer http://searchstorage.techtarget.com/report/Inside-Cisco-Systems-Unified-Computing-System published in Jul. 2009.*

(Continued)

*Primary Examiner* — Hamza Algibhah
(74) *Attorney, Agent, or Firm* — Patent Capital Group

(57) ABSTRACT

An example method for hybrid Fiber Channel (FC) storage with end-to-end storage provisioning and external connectivity in a storage area network (SAN) environment is provided and includes partitioning a SAN into an internal virtual storage area network (VSAN) for connectivity to an internal storage element located in a first portion of the SAN implemented in a unified computing system (UCS), where a second portion of the SAN is external to the UCS, partitioning the SAN into an external VSAN for connectivity to an external storage element located in the second portion of the SAN, and facilitating communication with the internal storage element over the internal VSAN and with the external storage element over the external VSAN. In one embodiment, border ports on a FI in FC switching mode are configured as N-ports for the external VSAN, and the external storage element is attached to the UCS through an N-port.

17 Claims, 7 Drawing Sheets

(56) References Cited

U.S. PATENT DOCUMENTS

| | | | |
|---|---|---|---|
| 8,031,703 B2 | 10/2011 | Gottumukkula et al. | |
| 8,161,134 B2 | 4/2012 | Mishra et al. | |
| 8,218,538 B1 | 7/2012 | Chidambaram et al. | |
| 8,230,066 B2 | 7/2012 | Heil | |
| 8,274,993 B2 | 9/2012 | Sharma et al. | |
| 8,335,231 B2 | 12/2012 | Kloth et al. | |
| 8,442,059 B1 | 5/2013 | de la Iglesia | |
| 9,207,882 B2 | 12/2015 | Rosset et al. | |
| 2003/0118053 A1* | 6/2003 | Edsall | H04L 12/4641 370/474 |
| 2003/0131182 A1* | 7/2003 | Kumar | G06F 3/0601 711/5 |
| 2003/0149763 A1* | 8/2003 | Heitman | G06F 3/0601 709/224 |
| 2004/0215749 A1* | 10/2004 | Tsao | H04L 41/12 709/220 |
| 2005/0036499 A1* | 2/2005 | Dutt | H04L 45/00 370/401 |
| 2005/0055428 A1* | 3/2005 | Terai | H04L 12/4641 709/220 |
| 2005/0185597 A1 | 8/2005 | Le | |
| 2006/0015928 A1 | 1/2006 | Setty | |
| 2006/0034302 A1* | 2/2006 | Peterson | H04L 45/04 370/401 |
| 2006/0251111 A1 | 11/2006 | Kloth | |
| 2007/0067593 A1* | 3/2007 | Satoyama | G06F 3/0613 711/165 |
| 2008/0294888 A1 | 11/2008 | Ando | |
| 2009/0083484 A1* | 3/2009 | Basham | G06F 3/0605 711/114 |
| 2009/0094380 A1* | 4/2009 | Qiu | G06F 21/80 709/239 |
| 2009/0094664 A1 | 4/2009 | Butler | |
| 2009/0201926 A1 | 8/2009 | Kagan | |
| 2009/0222733 A1 | 9/2009 | Basham | |
| 2011/0022691 A1 | 1/2011 | Banerjee et al. | |
| 2011/0087848 A1* | 4/2011 | Trent | H04L 67/1097 711/154 |
| 2011/0299539 A1* | 12/2011 | Rajagopal | H04L 12/4675 370/395.53 |
| 2012/0134672 A1* | 5/2012 | Banerjee | H04L 49/70 398/45 |
| 2012/0144014 A1* | 6/2012 | Natham | H04L 45/66 709/224 |
| 2012/0254440 A1* | 10/2012 | Wang | H04L 12/4645 709/226 |
| 2012/0331119 A1* | 12/2012 | Bose | H04L 61/6004 709/223 |
| 2013/0013664 A1* | 1/2013 | Baird | H04L 67/025 709/203 |
| 2013/0036212 A1 | 2/2013 | Jibbe et al. | |
| 2013/0138836 A1 | 5/2013 | Cohen et al. | |
| 2013/0163606 A1 | 6/2013 | Bagepalli et al. | |
| 2013/0212130 A1 | 8/2013 | Rahnama | |
| 2014/0039683 A1* | 2/2014 | Zimmermann | G06F 1/206 700/275 |
| 2014/0059187 A1* | 2/2014 | Rosset | G06F 13/14 709/220 |
| 2014/0219086 A1* | 8/2014 | Cantu' | H04L 47/18 370/231 |
| 2014/0307578 A1* | 10/2014 | DeSanti | H04L 41/0806 370/254 |
| 2014/0365622 A1* | 12/2014 | Iyengar | H04L 67/1097 709/220 |

OTHER PUBLICATIONS

USPTO Dec. 22, 2014 Final Office Action from U.S. Appl. No. 13/593,229.

U.S. Appl. No. 13/593,229, filed Aug. 23, 2012 entitled "System and Method for Policy Based Fibre Channel Zoning for Virtualized and Stateless Computing in a Network Environment," Inventors: Sebastien T. Rosset, et al.

U.S. Appl. No. 13/781,425, filed Dec. 18, 2012 entitled "System and Method for In-Band LUN Provisioning in a Data Center Network Environment," Inventors: Sebastien T. Rosset, et al.

USPTO Jul. 9, 2014 Non-Final Office Action from U.S. Appl. No. 13/593,229.

"Appendix D: Configuring In-Band Management," Sun Storage Common Array Manager Installation and Setup Guide, Version 6.7.x821-1362-10, Sun Oracle; 15 pages; Copyright © 2010, Oracle and/or its affiliates. All rights reserved. [Retrieved and printed Sep. 12, 2013] http://docs.oracle.com/cd/E19377-01/821-1362-10/inband.html.

"Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013 http://publib.boulder.ibm.com/infocenter/svc/ic/index.jsp?topic=%2Fcom.ibm.storage.svc.console.doc%2Fsvc_fastcontconfint_1ev5ej.html.

"Coraid Virtual DAS (VDAS) Technology: Eliminate Tradeoffs between DAS and Networked Storage," Coraid Technology Brief, © 2013 Coraid, Inc., Published on or about Mar. 20, 2013; 2 pages http://san.coraid.com/rs/coraid/images/TechBrief-Coraid_VDAS.pdf.

"EMC Unisphere:lnnovative Approach to Managing Low-End and Midrange Storage; Redefining Simplicity in the Entry-Level and Midrange Storage Markets," Data Sheet, EMC Corporation; 6 pages © 2013 EMC Corporation. All Rights Reserved. Published on or about Jan. 4, 2013 [Retrieved and printed Sep. 12, 2013] http://www.emc.com/storage/vnx/unisphere.htm.

"HP XP Array Manager Software—Overview & Features," Storage Device Management Software; Hewlett-Packard Development Company, 3 pages; © 2013 Hewlett-Packard Development Company, L.P. http://h18006.www1.hp.com/products/storage/software/amsxp/index.html.

"N-Port Virtualization in the Data Center," Cisco White Paper, Cisco Systems, Inc., Mar. 2008, 6 pages http://www.cisco.com/en/US/prod/collateral/ps4159/ps6409/ps5989/ps9898/white_paper_c11-459263.html.

"VBlock Solution for SAP: Simplified Provisioning for Operation Efficiency," VCE White Paper, VCE—The Virtual Computing Environment Company, Aug. 2011; 11 pages; © 2011 VCE Company LLC. All Rights reserved. http://www.vce.com/pdf/solutions/vce-sap-simplified-provisioning-white-paper.pdf.

Hosterman, Cody, et al., "Using EMC Symmetrix Storage inVMware vSphere Environments," Version 8.0, EMC² Techbooks, EMC Corporation; published on or about Jul. 8, 2008, 314 pages; [Retrieved and printed Sep. 12, 2013] http://www.emc.com/collateral/hardware/solution-overview/h2529-vmware-esx-svr-w-symmetrix-wp-ldv.pdf.

Swami, Vijay, "Simplifying SAN Management for VMWare Boot from SAN, Utlizing Cisco UCS and Palo," posted May 31, 2011; 6 pages http://virtualeverything.wordpress.com/2011/05/31/simplifying-san-management-for-vmware-boot-from-san-utilizing-cisco-ucs-and-palo/.

USPTO Apr. 28, 2015 Non-Final Office Action from U.S. Appl. No. 13/593,229.

USPTO Jan. 16, 2015 Non-Final Office Action from U.S. Appl. No. 13/718,425.

USPTO Sep. 16, 2015 Final Office Action from U.S. Appl. No. 13/593,229.

USPTO Feb. 3, 2016 Final Office Action from U.S. Appl. No. 13/593,229.

USPTO Aug. 10, 2015 Notice of Allowance from U.S. Appl. No. 13/718,425.

USPTO Jul. 5, 2016 Non-Final Office Action from U.S. Appl. No. 13/593,229.

* cited by examiner

US 9,503,523 B2

HYBRID FIBRE CHANNEL STORAGE WITH END-TO-END STORAGE PROVISIONING AND EXTERNAL CONNECTIVITY IN A STORAGE AREA NETWORK ENVIRONMENT

TECHNICAL FIELD

This disclosure relates in general to the field of communications and, more particularly, to a hybrid fibre channel (FC) storage with end-to-end storage provisioning and external connectivity in a storage area network (SAN) environment.

BACKGROUND

A SAN transfers data between computer systems and storage elements through a specialized high-speed network. The SAN consists of a communication infrastructure, which provides physical connections. It also includes a management layer, which organizes the connections, storage elements, and computer systems so that data transfer is secure and robust. The SAN allows an any-to-any connection across the network by using interconnect elements such as switches. The SAN introduces the flexibility of networking to enable one server or many heterogeneous servers to share a common storage utility. The SAN might include many storage devices, including disks, tapes, and optical storage. Additionally, the storage utility might be located far from the servers that use it.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for hybrid Fibre Channel (FC) storage with end-to-end storage provisioning and external connectivity in a storage area network (SAN) environment is provided and includes partitioning (e.g., subdividing, allocating, configuring, dividing, sectioning, etc.) a SAN into an internal virtual storage area network (VSAN) for connectivity to an internal storage element located in a first portion of the SAN implemented in a unified computing system (UCS), where a second portion of the SAN is external to the UCS, partitioning the SAN into an external VSAN for connectivity to an external storage element located in the second portion of the SAN, and facilitating communication with the internal storage element over the internal VSAN and with the external storage element over the external VSAN. "Storage Area Network" corresponds to a network connecting various network elements (e.g., servers, computers, etc.) with one or more storage devices (e.g., hard disk drives, tape drives, etc.), which include devices used exclusively for storing (e.g., recording) information (e.g., data). In one embodiment, border ports on a FI in FC switching mode are configured as N-ports for the external VSAN, and the external storage element is attached to the UCS through an N-port.

Example Embodiments

Figure 1:
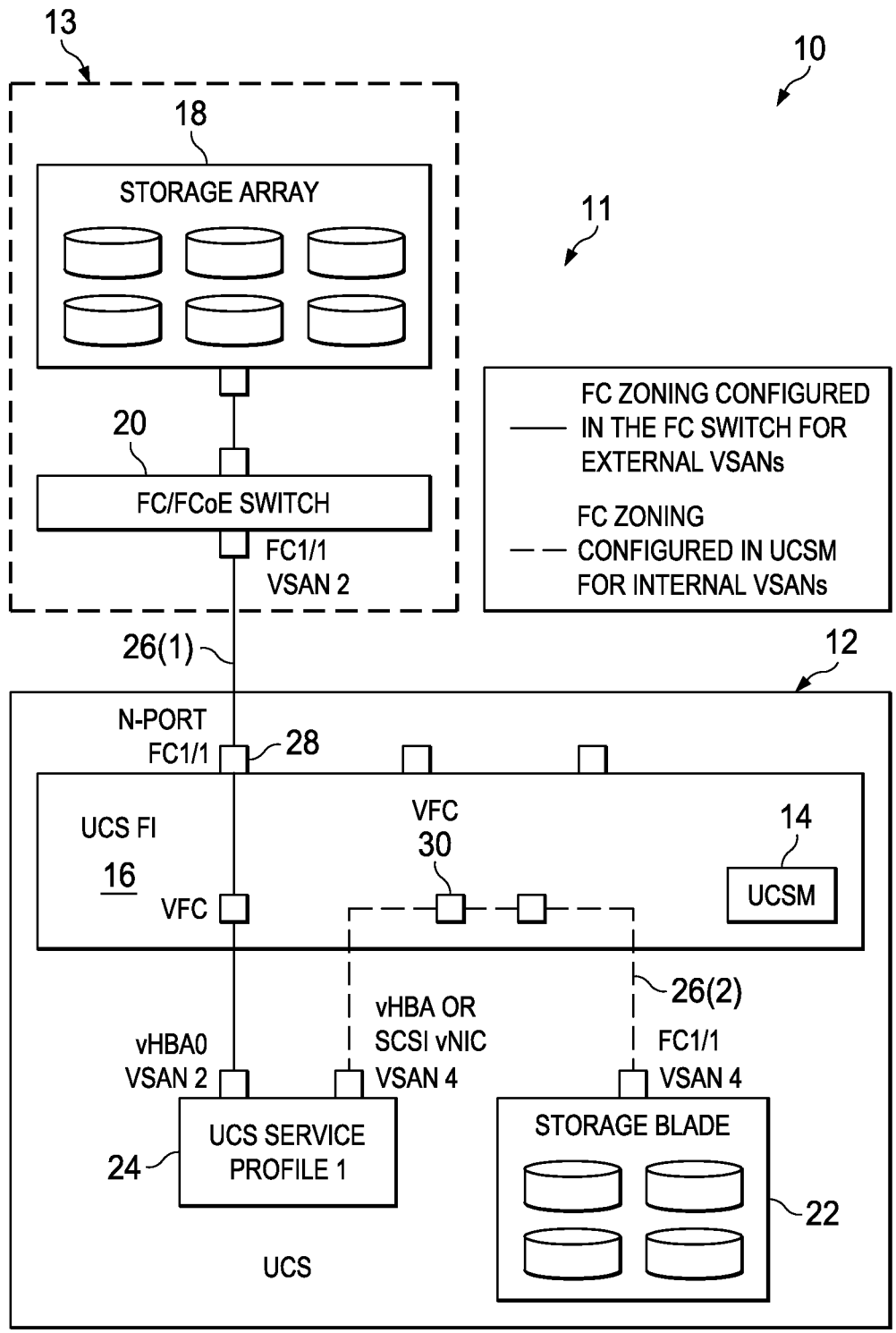
FIG. 1 is a simplified block diagram of a communication system for hybrid FC storage with end-to-end storage provisioning and external connectivity in a SAN environment in accordance with one embodiment.

FIG. 1 is a simplified block diagram of an example embodiment of a communication system 10 for hybrid FC storage with end-to-end storage provisioning and external connectivity in a SAN environment. A SAN 11 includes a first portion, comprising a unified computing system (UCS) 12, and a second portion 13 that is external to UCS 12. UCS 12 includes a network infrastructure that unites computing, network, and storage access in a scalable, multi-chassis platform, in which network and storage resources are integrated into a unified management domain, managed centrally by a UCS manager (UCSM) 14 executing in a fabric interconnect (FI) 16.

UCSM 14 may provide a unified, embedded management of software and hardware components of UCS 12 across multiple chassis, rack servers, and virtual machines. UCSM 14 can participate in server provisioning, device discovery, inventory, configuration, diagnostics, monitoring, fault detection, auditing, and statistics collection (among other functionalities). The architecture of UCSM 14 can include multiple software layers with well-defined boundaries. Suitable application gateways executing in UCSM 14 may act as hardware abstraction layers between a data management engine (DME) and managed endpoints (e.g., servers, storage elements, etc.). The DME stores and maintains states for the managed endpoints, including configuration information. Configuration changes (and settings) may be propagated to the endpoints appropriately by UCSM 14.

One or more external storage array 18 (e.g., located in second portion 13 of SAN 11) may be connected to FI 16 through a FC/Fibre Channel over Ethernet (FCoE) switch 20. UCS 12 may further comprise an internal storage blade 22 (e.g., located in the first portion of SAN 11 comprising UCS 12). (Substantially all servers and storage blades attached to FI 16 over appropriate ports become part of the single, highly available management domain of UCSM 14 and are considered to be internal to UCS 12 as the term is used in this disclosure. External devices are connected to FI 16 over specific ports that are distinct from the ports used for internal devices. In general, each network element has one or more ports that connect it to the SAN. Ports are identified in a number of ways. For example, World Wide Name (WWN) is a globally unique identifier for a port that allows certain applications to access the port. UCSM 14 can discover the WWN of a device or host and assign a port address to the device). As used herein, the term "storage array" and "storage blade" can be used interchangeably to refer to storage elements configured to store data and permit input/output access to the data using suitable protocols, such as Small Computer System Interface (SCSI), Internet Small Computer System Interface (iSCSI), FC and FCoE.

A user (not shown) may log into UCS 12 through a service profile 24 to access storage array 18 and storage blade 22 through FI 16 within the broad scope of the embodiments. Service profile 24, which is a logical description of a physical server, can contain values for the (specific) server's property settings, including virtual Network Interface Cards (vNICs) or virtual Host Bus Adaptors (vHBAs), Media Access Control (MAC) addresses, boot policies, firmware policies, and other elements as appropriate.

According to various embodiments, SAN 11 may be partitioned into a plurality of distinct virtual (e.g., logical) partitions called virtual SANs (VSANs). In particular, external storage array 18 may be included in VSAN 26(1) (e.g., VSAN 2) and internal storage blade 22 may be included in VSAN 26(2) (e.g., VSAN 4). The various storage elements may communicate with FI 16 over appropriate interfaces. For example, external storage array 18 may communicate with FI 16 over a N-port 28; internal storage blade 22 and service profile 24 may communicate with FI 16 over virtual FC interfaces (VFC) 30.

For purposes of illustrating certain example techniques of communication system 10, it is important to understand how typical communications may traverse the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

A SAN can be used to bypass traditional network bottlenecks. It facilitates direct, high-speed data transfers between servers and storage devices, potentially in any of the following three ways: server to storage, where the same storage device is accessed serially or concurrently by multiple servers; server to server: where the SAN facilitates high-speed, high-volume communication between servers; storage to storage providing outboard data movement capability that enables data to be moved without server intervention, thus freeing up server processor cycles for other activities like application processing (e.g., a disk device that backs up its data to a tape device without server intervention, or a remote device mirroring across the SAN. A conventional enterprise data center typically uses Ethernet for LAN communications and FC for the SAN. FC is a high-speed network technology (commonly running at 2-, 4-, 8-, and 16-gigabit speeds) primarily used in SANs. FC includes a topology where devices are connected to FC switches, conceptually similar to Ethernet switches. FC traffic generally requires a lossless transport layer because losing a single data packet in the data storage context may be unacceptable.

Blade center deployments and top-of rack aggregation devices are being increasingly used in SAN environments. As edge switch (e.g., SAN switches on the network edge) population grows with increasing network size, the number of domain IDs is of concern. Because the total number of domain identifiers (IDs) (which has a one-to-one correspondence with the number of SAN switches) that can exist in a physical fabric in FC SANs is limited to 256, the storage elements have to be judiciously allocated to the limited number of available domains. (The SAN switches use the FC domain ID to route frames from a specific initiator (e.g., source, such as a server or customer end device) to any target (e.g., destination such as a storage element) in the SAN fabric. The 1 byte domain ID allows up to 256 possible addresses according to FC standards.) As used herein, the term "SAN switch" refers to a FC or FCoE enabled network switch. SAN switches can also include Fabric Interconnects used in UCS architecture.

Another concern is interoperability with third-party switches. In the past, different SAN fabric vendors interpreted the FC addressing standard differently. In addition, some vendor-specific attributes used for switch-to-switch connectivity in expansion ports (E-Ports) made connection of SAN switches from different vendors challenging, leading customers to implement edge switch technology that matched the core director type in the fabric. The E-port functions as a fabric expansion port. One E-port on a specific switch (e.g., FI) may be connected to another E-port on another switch to create an Inter-Switch Link (ISL) between the two switches. E-ports generally carry frames between switches for configuration and fabric management.

In contrast to E-ports, N-ports present FC host interfaces to the SAN switches. When the SAN switch is configured in N-port virtualization (NPV) mode, the SAN switch appears as a server to the switch that connects to it over the N-port. NPV allows a single N-Port to be assigned multiple N-Port IDs or FC IDs (FCIDs) over a single link. The FCIDs can be managed on a FC fabric as unique entities on the same physical host. In a virtual machine environment where many host operating systems or applications are running on a physical host, each virtual machine can be managed independently from zoning, aliasing, and security perspectives. Moreover, because the connection from the edge switch to the core switch is treated as an N-Port and not an E-Port, the edge switch shares the domain ID of the core switch as FCIDs are being allocated. The edge NPV-enabled switch no longer requires a separate domain ID to receive connectivity to the fabric.

Typically, the UCS system in the SAN appears to the outside world (e.g., outside the portion of the SAN comprising the UCS) as a collection of Network Interface Cards (NICs) and Fibre Channel Host Bus Adapters (FC HBAs). The FI in the UCS architecture serves as a "controller" for the array of network resources managed by the UCSM executing in the FI. The FI typically runs in the NPV mode, allowing the FI to act like a server, for example, allowing multiple hosts to login to the upstream fabric on the same number of FC uplink ports.

Each internal storage element (e.g., disk-drive, storage partition or volumes, etc.), may be identified by a unique logical unit number (LUN) in the UCS. As used herein, the term "storage element" comprises a network element configured to store data substantially exclusively and to permit input/output access to the data. "Network element" encompasses computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. Examples of storage elements include storage blades, storage arrays, direct-attached storage, hard disk drives, magnetic tapes, storage partitions, storage volumes, etc.

In some UCS systems, the LUNs may be exposed through FC or FCoE targets with suitable FC zoning configured in the FC fabric. (FC zoning is the partitioning of a FC fabric into smaller subsets to restrict interference, add security, and to simplify management. To restrict server access to storage arrays not allocated to that server, the SAN uses zoning. Typically, zones are created for each group of servers that access a shared group of storage devices and LUNs. zones define connectivity between HBAs and service profiles. Devices outside a zone are not visible to the devices inside the zone). In the UCS, UCSM can be used to configure FC zoning; however, FC services should be enabled in the FI to facilitate the configuration. FC services include functions like encryption, role based access control (RBAC), redundant array of independent disks (RAID) redundancy, controller services, etc. To permit FC services, the FI should be placed in a FC switching mode rather than the NPV mode (FC zoning is not possible in NPV mode because the FI cannot run fabric services in the NPV mode).

However, if the FI is placed in the FC switching mode, rather than the NPV mode, connectivity problems may arise when the FI is also connected to an upstream external FC/FCoE switch (e.g., not all switches may be compatible with E-ports, which are the uplink ports in FC switching mode; moreover, some switches may not work with the N-port which appears as a server port). Moreover, in the FC switching mode, the UCS border port (e.g., external network facing port) is configured as an E-port, and the FC fabric connected to the external storage array is extended to the UCS, which can mean that fabric failure domain could also be extended to the UCS. Additionally, the UCS may have to be included in the fabric management, instead of being treated as a server. Extending the FC fabric can also cause some instability in the SAN. Because the FC switching mode and the NPV mode are mutually exclusive, the UCSM cannot configure and provide connectivity for both internal storage blades and external storage arrays from end-to-end in currently existing systems.

Communication system 10 can resolve the aforementioned issues (and potentially others) associated with hybrid FC storage and storage provisioning (among other features) in a SAN environment. In various embodiments, SAN 11 may be partitioned into an internal VSAN (e.g., 26(2)) for connectivity to an internal storage element (e.g., storage blade 22) located in UCS 12, and an external VSAN (e.g., 26(1)) for connectivity to an external storage element (e.g., storage array 18) located in portion 13 of SAN 11. Embodiments of communication system 10 may facilitate communication with the internal storage element (e.g., storage blade 22) over the internal VSAN (e.g., VSAN 26(2)) and with the external storage element (e.g., storage array 18) over the external VSAN (e.g., VSAN 26(1)). In a specific example embodiment, border ports on FI 16 connecting to the external storage element (e.g., storage array 18) may be configured as N-port 28 for the external VSAN (e.g., 26(1)) even though FI 16 is in FC switching mode. Thus, FI 16 may behave as an N-Port Virtualizer, although it is configured in FC switching mode.

According to some embodiments, the internal storage element (e.g., storage blade 22) may be attached to UCS 12 through vFC interface 30 of FI 16 configured in FC switching mode. In other embodiments, the internal storage element may comprise a direct-attached storage attached to UCS 12 through an appliance port of FI 16 configured in FC switching mode. In yet other embodiments, the internal storage element may comprise a storage array (similar to storage array 18) attached via another SAN switch (similar to FC/FCoE switch 20) to UCS 12 through an E-port of FI 16 configured in FC switching mode. Note that the internal VSAN (e.g., 26(2)) and the external VSAN (e.g., 26(1)) may be distinguished from each other by distinct VSAN identifiers (IDs).

In some embodiments, UCSM 14 may receive storage requirements associated with an initiator (e.g., service profile 24) and one or more targets (e.g., storage blade 22, storage array 18) in SAN 11. UCSM 14 may generate configuration settings for the initiator, and the targets, and generate FC services in FI 16. The configuration settings for the initiator may comprise appropriate NICs at the initiator to facilitate LUNs of the targets appearing as local disks at the initiator. The configuration settings for the targets may comprise suitable configurations for target ports, disk groups, volumes, LUNs and LUN mappings on the corresponding targets. In various embodiments, generating the FC services can comprise retrieving initiator-to-target connectivity requirements for internal storage elements using WWNs of the initiator and the targets, computing FC zone sets, FC zones and FC zone members without user intervention, performing UCSM-managed zoning on the internal VSAN (e.g., 26(2) for internal storage connectivity), and facilitating fabric-based zoning on the external VSAN (e.g., 26(1)) for external storage connectivity).

According to various embodiments, UCS 12 may be configured in FC switching mode to enable the FC fabric services. The user can configure "external VSANs" for connectivity to external storage elements and "internal VSANs" for connectivity to internal storage elements. Internal VSANs may be automatically managed by UCS 12 (through UCSM 14), including FC zoning. External VSANs may be managed outside UCS 12 by appropriate owners. Internal VSANs may be distinct from external VSANs using appropriate VSAN IDs (or domain IDs in some embodiments). Uplink FC/FCoE ports in FI 16 may be configured as FC N-ports to enable connectivity with external storage, despite FI 16 being in the FC switching mode.

UCS 12 may implement a hybrid mode where uplink FC/FCoE N-Ports and FC services can coexist in the same UCS instantiation. One FC domain ID may be assigned for external storage, and another FC domain ID may be assigned for internal storage elements. The external domain ID may be managed by a storage administrator outside UCS 12. The internal domain ID may be managed entirely by UCSM 14, and may not be exposed externally. Internal VSANs (including internal zoning) may not be advertised to any border port of UCS 12.

External and internal VSANs may be configured such that external VSANs are distinct from internal VSANs. For example, the same VSAN ID may not be used for both internal and external storage, ensuring that internal FC zoning is separate from external FC zoning. UCS 12 may maintain the separation between external and internal VSANs. In particular, a specific VSAN cannot be used for both external and internal storage connectivity. The VSAN ID allocation can be enforced by UCSM 14, which has access to substantially all FC ports, VSANs and vHBA configuration in UCS 12.

FC/FCoE border ports can be configured as N-ports for external VSANs even though FI 16 is configured in FC switching mode. From the upstream switch (e.g., FC/FCoE switch 20) perspective, UCS 12 may appear the same as if UCS 12 had been configured in FC NPV mode with uplink ports configured as N-ports in NPV mode. Internal VSANs may use FC switching capabilities (including FC zoning) of UCSM 14. External FC/FCoE switches may distribute the FC zoning configuration for the external VSANs, and UCSM 14 may assume ownership of the FC zoning for internal VSANs.

In some embodiments, the internal VSAN may be limited to one UCS domain. In such embodiments, UCS 12 may not use global domain IDs. UCSM 14 may automatically assign an internal domain ID to the internal storage elements. Because internal domain IDs are independent of external domain IDs, there may not be any conflict in IDs (which can be a concern as only 255 domain IDs are allowed in FC SANs). Further, as the assignment is automatic (e.g., without user intervention), user input and management may be minimized.

In some embodiments, the internal VSANs may extend to two or more UCS domains. For example, internal storage elements can be shared among two or more UCS instances. In such embodiments, an E-port on one FI may be connected directly to another E-port on another FI in an internal VSAN. In such cases, the user may manually assign domain IDs on the internal VSAN, such that separate domain IDs are assigned to connected UCS instances using the internal storage elements. The domain ID used for internal storage elements may be different from the domain ID used for external storage.

In various embodiments, a host (e.g., server represented by service profile 24) can be configured with vHBAs for external and internal storage elements. One vHBA may be configured with an external VSAN, and another vHBA on the same host may be configured with an internal VSAN. In some embodiments, the host can be configured for external storage connectivity only, or internal storage connectivity only, or none, or both. In a user interface (e.g., graphical user interface (GUI), command line interface (CLI) or application programming interface (API)) of UCSM 14, the user can specify storage requirements using a simple logical representation. For example, the user may specify a logical server requires a 20 GB boot LUN and 50 GB shared LUN. The user may not have to enter other details about FC, FCoE and FC zoning.

UCSM 14 may process the high-level storage requirements and automatically configure both the initiator and targets. On the host side, the initiator can be automatically configured by UCSM 14 with FCoE and/or SCSI NICs with vDAS/FCoE such that LUNs appear as local disks. SCSI NICs may simplify the deployment as LUNs appear as local devices. On the targets, UCSM 14 may automatically configure FC or FCoE target ports, disk groups, volumes, LUNs and LUN mappings. UCSM 14 may also automatically configure the FC fabric services. UCSM 14 may have substantially complete knowledge of the initiator-to-target connectivity requirements for the internal storage elements. For example, UCSM 14 may know the WWNs of the initiator and corresponding targets. Hence, UCSM 14 can automatically compute FC zone sets, FC zones and FC zone members without any user intervention. Embodiments of communication system 10 can perform UCSM-managed zoning on internal VSANs while supporting Fabric-based zoning on external VSANs.

In various embodiments, higher level management functions may be included to simplify the operational model. Such management functions may include, by way of examples, and not as limitations, FC zoning policies; automatic assignment of domain IDs for internal storage elements; automatic validation of VSAN IDs (e.g., determining that VSAN IDs do not overlap between external and internal storage elements); deferred deployment; role based access control (RBAC); etc. In addition, the user can decide whether uplink FC/FCoE ports are configured as E-ports or N-ports for each uplink port.

Embodiments of communication system 10 can provide a hybrid storage model in which an integrated computer system (e.g., UCS 12) provides access to both external and internal FC/FCoE storage elements. The internal storage elements may be provisioned using high-level requirements and can be fully automated. Embodiments of communication system 10 can provide substantially complete automation of internal storage provisioning while maintaining existing operational management model for external storage elements.

Turning to the infrastructure of communication system 10, SAN 11 represents a series of points or nodes of interconnected communication paths for receiving and transmitting packets of information that are delivered to communication system 10. SAN 11 offers a communicative interface between storage elements and/or hosts, and may include, in addition, any local area network (LAN), wireless local area network (WLAN), metropolitan area network (MAN), Intranet, Extranet, WAN, virtual private network (VPN), or any other appropriate architecture or system that facilitates communications in a network environment and can provide lossless service, for example, similar to (or according to) FC/FCoE or other SAN protocols. SAN 11 may implement any suitable communication protocol for transmitting and receiving data packets within communication system 10. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

Figure 2:
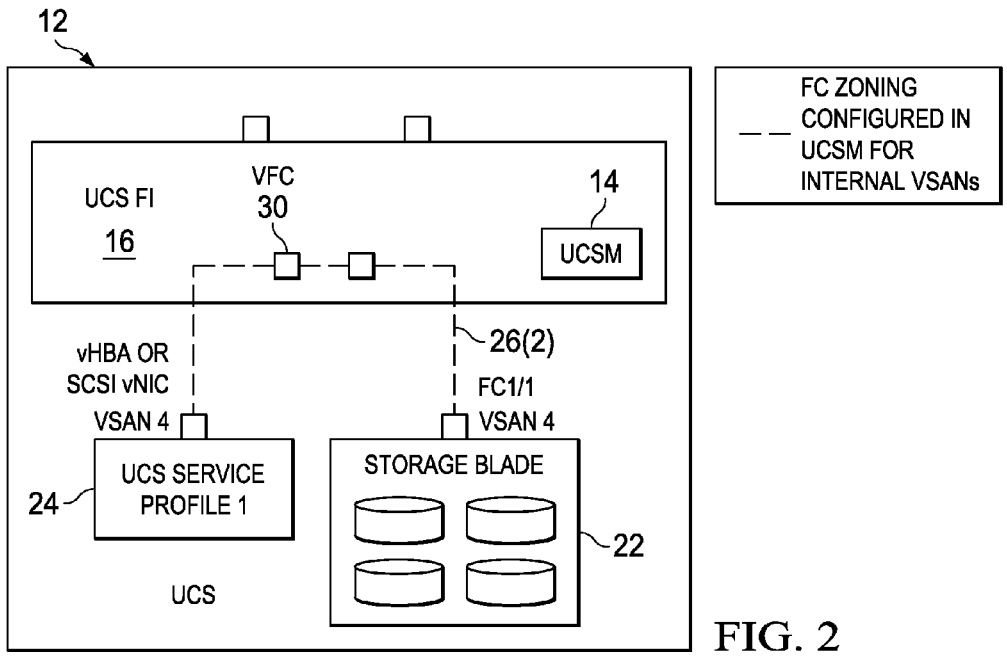
FIG. 2 is a simplified block diagram illustrating possible example details according to an embodiment of the communication system.

Turning to FIG. 2, FIG. 2 is a simplified block diagram illustrating certain details of an example embodiment of communication system 10. FC zoning may be configured in UCSM 14 for internal VSANs (e.g., VSAN 26(2)). In some embodiments, as illustrated herein, the NIC (e.g., vHBA, SCSI, vNIC) of the initiator host (e.g., service profile 24) may be configured exclusively for internal storage connectivity to storage blade 22. Upon receiving the storage requirements for the initiator to target connectivity, UCSM 14 may automatically configure the internal VSAN 26(2), FC zoning, and other parameters (and details) to implement the storage requirements.

Figure 3:
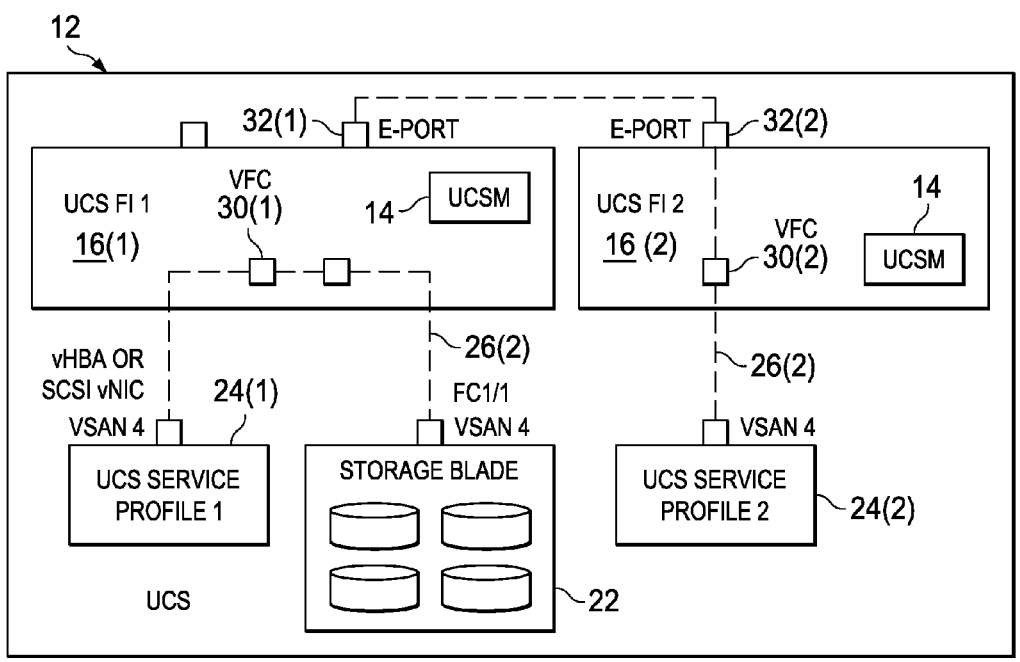
FIG. 3 is a simplified block diagram illustrating other possible example details according to an embodiment of the communication system.

Turning to FIG. 3, FIG. 3 is a simplified block diagram illustrating certain details of an example embodiment of communication system 10. Internal storage elements (e.g., storage blade 22) may span multiple UCS domains. FI 16(1) and FI 16(2) may be connected to each other over E-ports 32(1) and 32(2). Service profile 24(2) may access storage blade 22 over internal VSAN 26(2). The user may manually assign separate domain IDs on internal VSAN 26(2) when the UCS instances are connected over E-port on internal VSAN 26(2) (e.g., one UCS instance implemented in FI 16(1) and another UCS instance implemented in FI 16(2)), using internal storage blade 22. The domain ID used for internal storage blade 22 may be different from the domain ID used for external storage (not shown).

Figure 4:
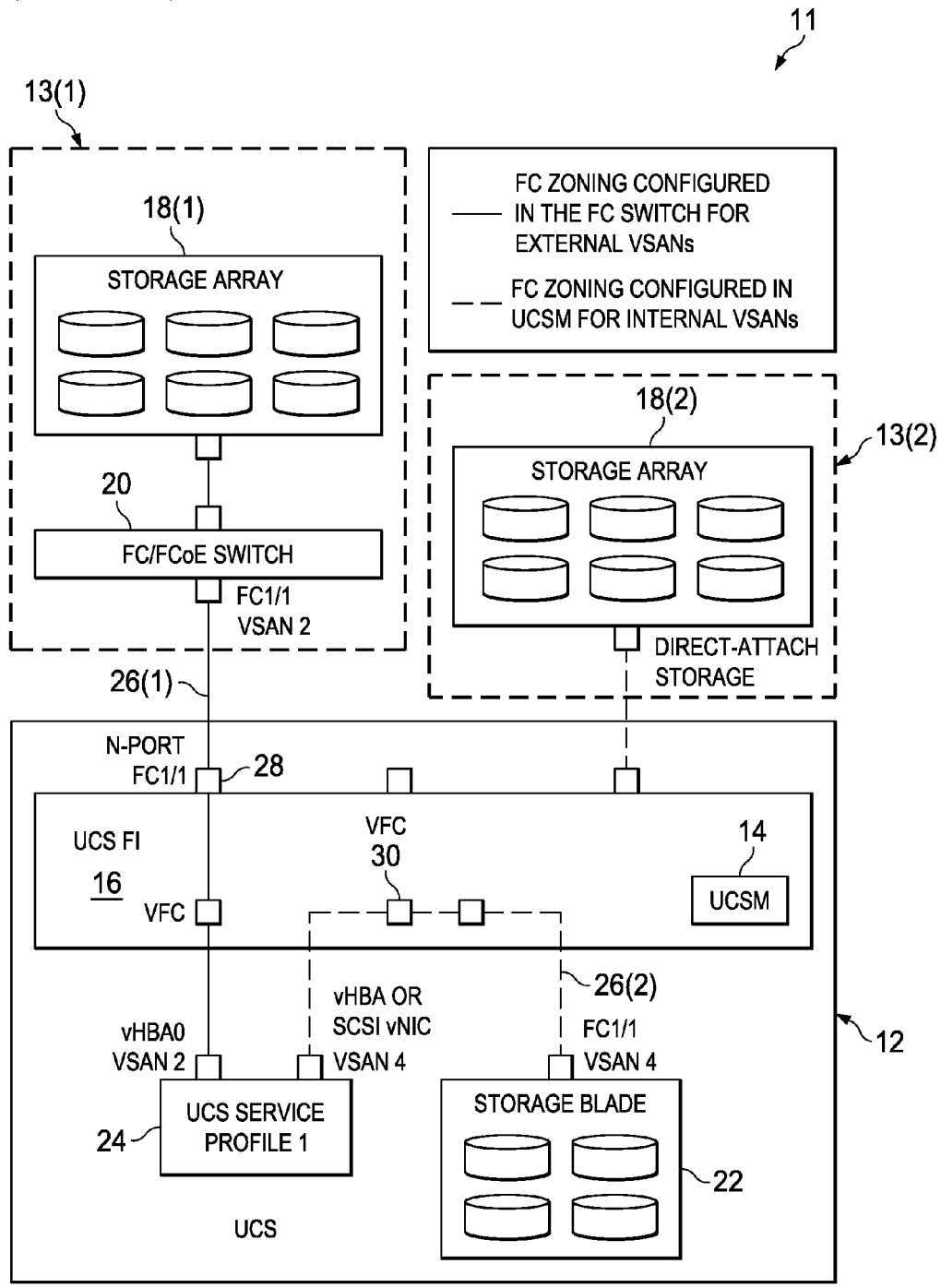
FIG. 4 is a simplified block diagram illustrating yet other possible example details according to an embodiment of the communication system.

Turning to FIG. 4, FIG. 4 is a simplified block diagram illustrating certain details of an example embodiment of communication system 10. Direct attached storage array 18(2) may be directly connected to FI 16 over an appliance port (or equivalent port). Direct-attached storage array 18(2) can be handled as an internal storage element by UCSM 14 according to an embodiment of communication system 10. UCSM 14 can discover direct-attached storage array 18(2) during configuration. During the discovery, UCSM 14 can perform an inventory of the FC/FCoE storage ports in direct-attached storage array 18(2) for automatic configuration of FC zoning.

Figure 5:
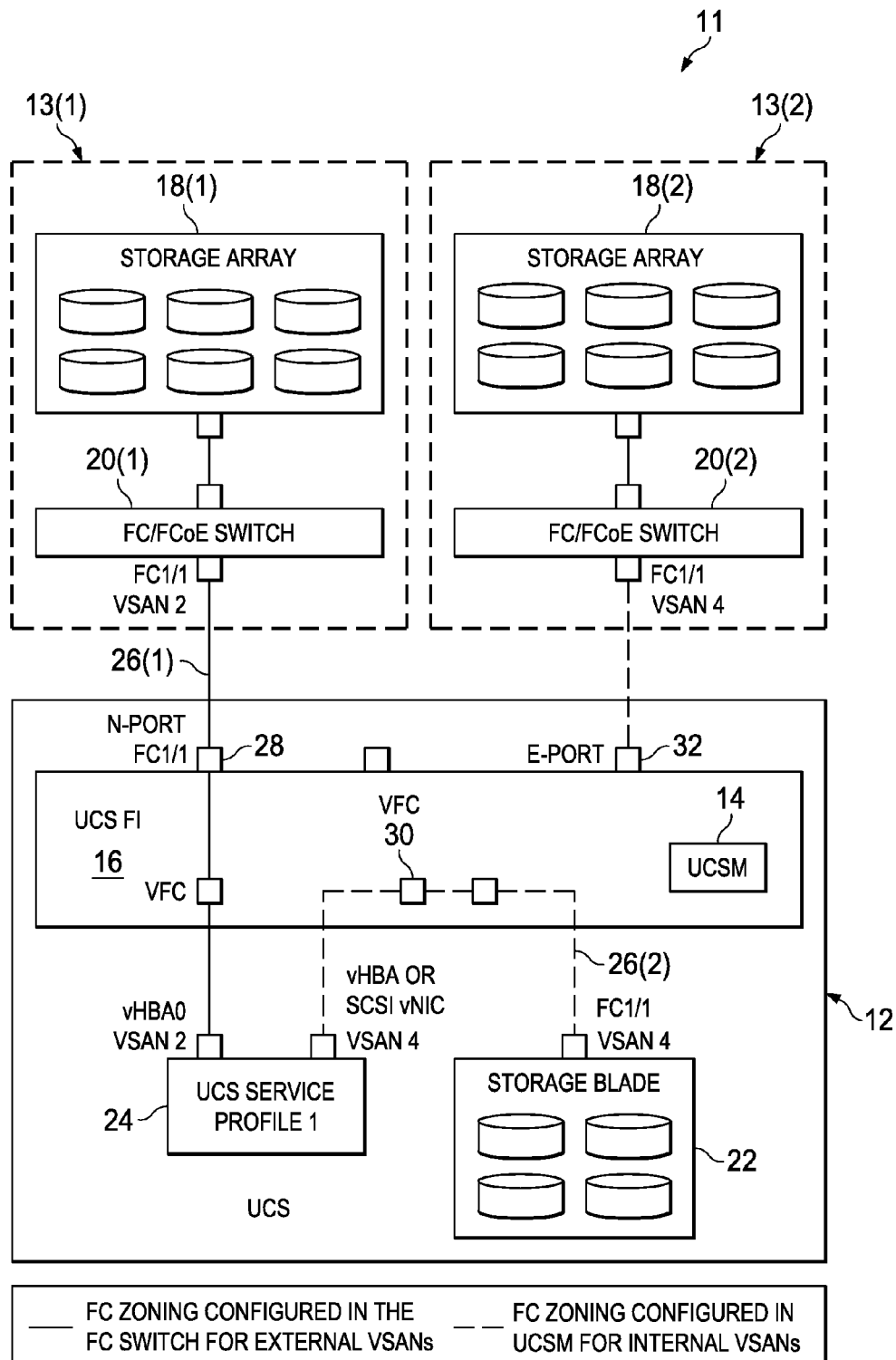
FIG. 5 is another simplified block diagram illustrating yet other possible example details according to an embodiment of the communication system.

Turning to FIG. 5, FIG. 5 is a simplified block diagram illustrating certain details of an example embodiment of communication system 10. In some embodiments, external storage elements (e.g., storage array 18(2)) can be connected to UCS 12 over E-port 32. Consequently, UCS 12 may become part of the switch fabric of FC/FCoE switch 20(2). Storage array 18(2) may be treated as part of internal VSAN 26(2) with appropriate FC zoning, domain IDs, etc.

Figure 6:
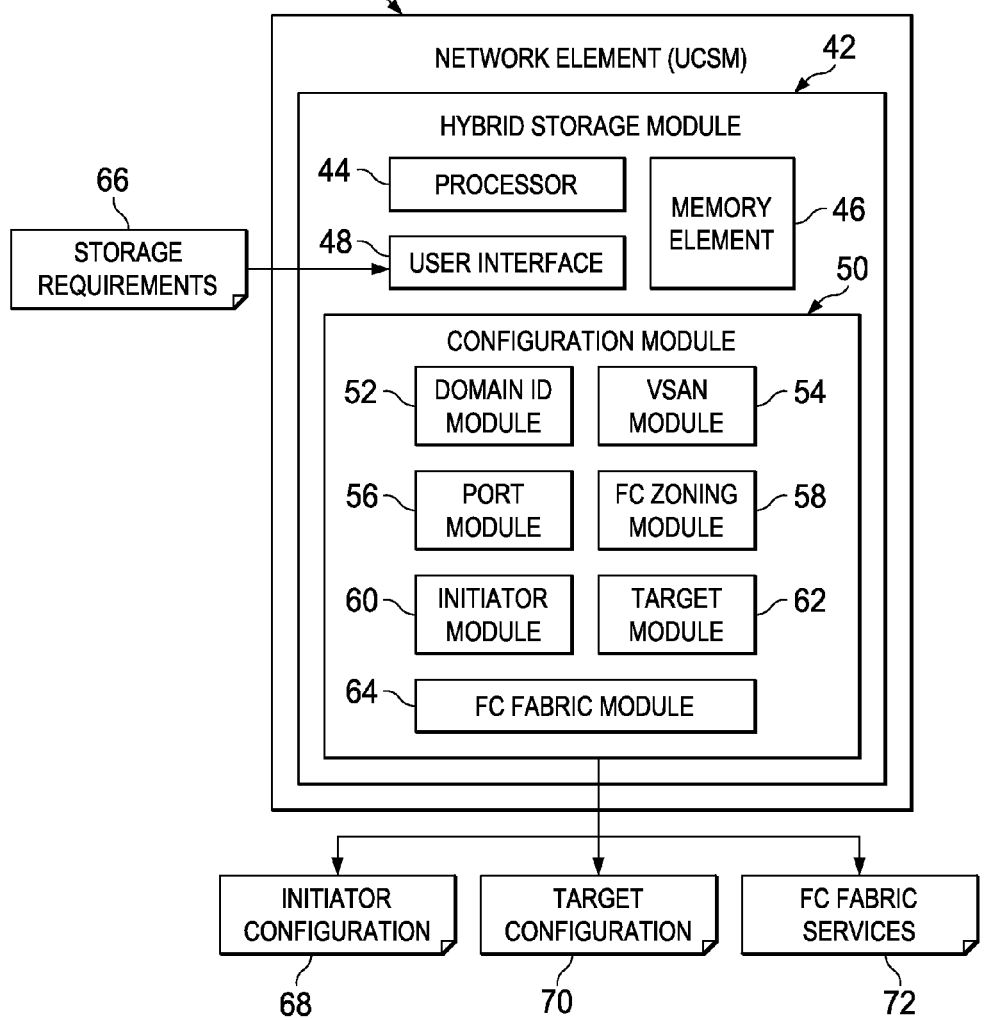
FIG. 6 is a simplified block diagram illustrating yet other possible example details according to an embodiment of the communication system.

Turning to FIG. 6, FIG. 6 is a simplified block diagram illustrating certain details of an example embodiment of communication system 10. Network element 40 may execute an instance of UCSM 14. An example of network element 40 includes FI 16. A hybrid storage module 42 may execute in network element 40. Hybrid storage module 42 may include a processor 44, a memory element 46, a user interface 48 and a configuration module 50. In various embodiments, user interface 48 may include any suitable interface configured to permit the user to input storage requirements in a simple logical representation. Examples of user interface 48 include GUI, CLI and API. Configuration module 50 may include a domain ID module 52, a VSAN module 54, a port module 56, a FC zoning module 58, an initiator module 60, a target module 62, and a FC fabric module 64.

Storage requirements 66 may be input into user interface 48 by the user. Storage requirements 66 may be input in a simple logical representation, without details about FC zoning, FC zone members, etc. For example, the user may specify a logical server requires a 20 GB boot LUN and 50 GB shared LUN. Based on storage requirements 66, configuration module 50 may generate initiator configuration 68, target configuration 70, and FC fabric services 72. Domain ID module 52 may determine whether external storage elements and internal storage elements are specified in storage requirements 66. Accordingly, domain ID module 52 may assign an internal domain ID to the internal storage elements and an external domain ID to the external storage elements. VSAN module 54 may generate an internal VSAN for internal storage connectivity and an external VSAN for external storage connectivity. The internal VSAN may be assigned to the internal domain ID and the external VSAN may be assigned to the external domain ID. Port module 56 may configure border ports and other ports accordingly. For example, border ports on the external VSAN may be configured to be N-ports. FC zoning module 58 may configure FC zones in the internal VSAN appropriately.

Initiator module 60 may generate initiator configuration 68, which can include, by way of examples and not as limitations, appropriate NICs at the initiator to facilitate LUNs of the one or more targets appearing as local disks at the initiator. Target module 62 may generate target configuration 70, which can include, by way of examples and not as limitations, configuration of target ports, disk groups, volumes, LUNs and LUN mappings. FC fabric module 64 may retrieve initiator-to-target connectivity requirements for the internal storage elements using WWNs of the initiator and the targets. In some embodiments, the WWNs and other details may be retrieved from a database based on specifications in storage requirements 66. In other embodiments, the WWNs and other details may be specified in storage requirements 66. FC zoning module 58 may compute FC zone sets, FC zones and FC zone members without user intervention and provide the zoning configuration to FC fabric module 64. FC zoning module 58 may perform UCSM-managed zoning on the internal VSAN and facilitate fabric-based zoning on the external VSAN.

Figure 7:
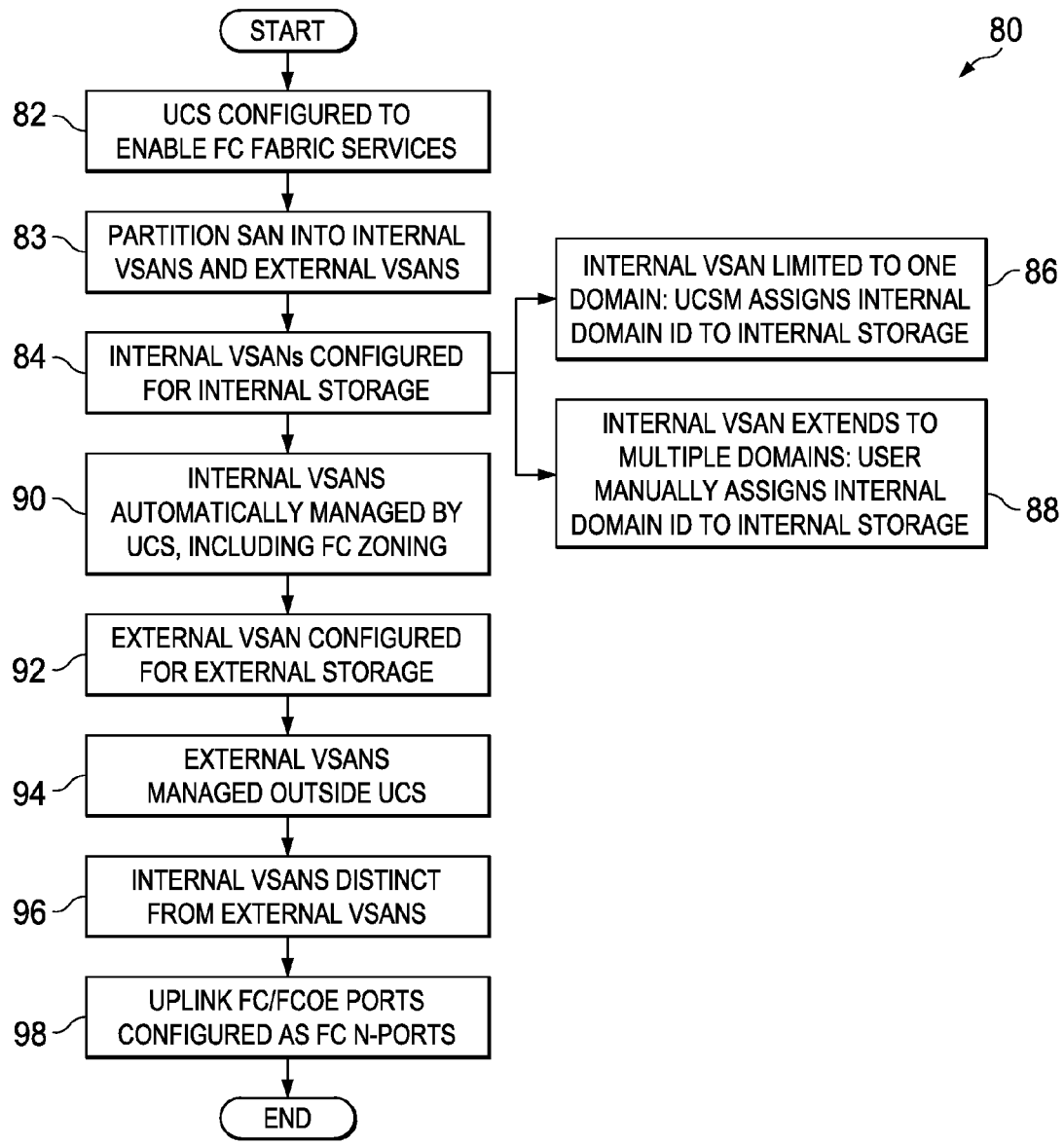
FIG. 7 is a simplified flowchart illustrating potential example operations that may be associated with embodiments of the communication system.

Turning to FIG. 7, FIG. 7 is a simplified flow diagram illustrating example operations 80 that may be associated with embodiments of communication system 10. At 82, UCS 12 may be configured in FC switching mode to enable FC fabric services. At 83, SAN 11 may be partitioned into internal VSANs (e.g., 26(2)) and external VSANs (e.g., 26(1)). At 84, internal VSANs may be configured for internal storage connectivity. In one example embodiment, at 86, internal VSANs may be limited to one domain; UCSM 14 may assign internal domain IDs to internal storage elements. In another example embodiment, at 88, internal VSANs may span more than one domain; the user may manually assign internal domain IDs to internal storage elements. At 90, internal VSANs may be automatically managed by UCSM 14 (including FC zoning) without user intervention. At 92, external VSANs may be configured for external storage connectivity. External VSANs may be managed externally (e.g., outside UCS 12) at 94. At 96, UCSM 14 may ensure that internal VSANs are distinct from external VSANs, for example internal VSANs and external VSANs use different VSAN IDs. At 98, uplink FC/FCoE ports may be configured as N-ports (e.g., based on user preferences).

Figure 8:
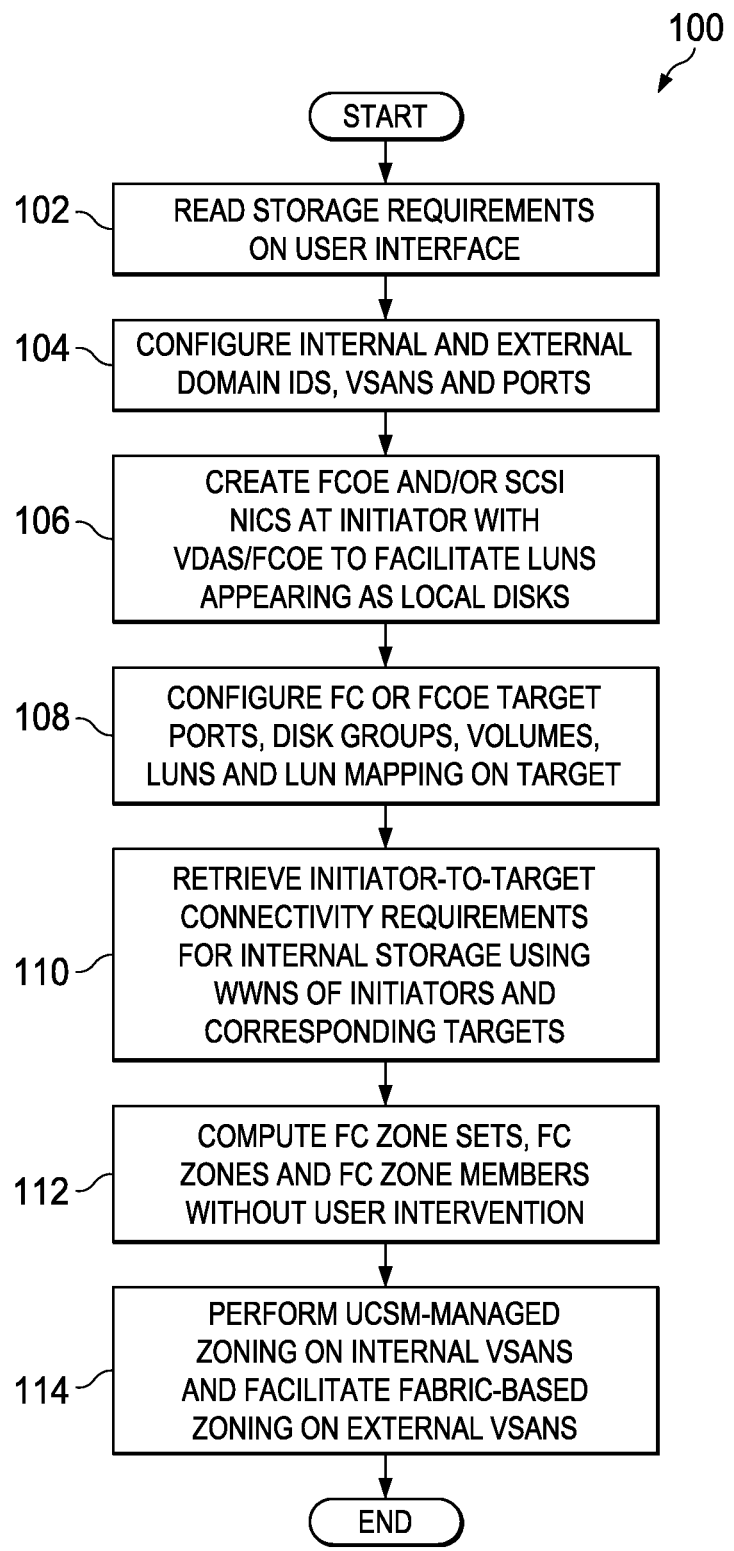
FIG. 8 is a simplified flowchart illustrating other potential example operations that may be associated with embodiments of the communication system.

Turning to FIG. 8, FIG. 8 is a simplified flow diagram illustrating example operations 100 that may be associated with embodiments of communication system 10. At 102, UCSM 14 may read storage requirements 66 on user interface 48. At 104, UCSM 14 may configure internal domain IDs, internal and external VSANs and ports (e.g., N-ports, vFCs, etc.). At 106, UCSM 14 may create FCOE and/or SCSI NICs at initiators with VDAS/FCoE to facilitate LUNS appearing as local disks. At 108, UCSM 14 may configure FC or FCoE target ports, disk groups, volumes, LUNS and LUN mappings on targets. At 110, UCSM 14 may retrieve initiator-to-target connectivity requirements for internal storage using WWNs of initiators and corresponding targets. At 112, UCSM 14 may compute FC zone sets, FC zones and FC zone members without user intervention. At 114, UCSM 14 may perform UCSM-managed zoning on internal VSANs and facilitate fabric-based zoning on external VSANs.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, FI 16. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, FI 16 (and other SAN switches) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory element 46) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 44) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   partitioning a storage area network (SAN) into an internal virtual storage area network (VSAN) for connectivity to an internal storage element, wherein a first portion of the SAN is implemented in a unified computing system (UCS) and a second portion of the SAN is external to the UCS, wherein the internal storage element is located in the first portion of the SAN;
   partitioning the SAN into an external VSAN for connectivity to an external storage element located in the second portion of the SAN; and
   facilitating communication with the internal storage element over the internal VSAN and with the external storage element over the external VSAN;

wherein the method further comprises:
  receiving storage requirements associated with an initiator and one or more targets in the SAN;
  generating configuration settings for the initiator, and the one or more targets; and
  generating FC services in a FI of the UCS.

2. The method of claim 1, wherein border ports on a Fabric Interconnect (FI) in Fibre Channel (FC) switching mode are configured as N-ports for the external VSAN, wherein the external storage element comprises a storage array attached via a SAN switch to the UCS through one of the N-ports.

3. The method of claim 1, wherein the internal storage element comprises a storage blade attached to the UCS through a virtual Fibre Channel (vFC) interface of a FI configured in FC switching mode.

4. The method of claim 1, wherein the internal storage element comprises a direct-attached storage attached to the UCS through an appliance port of a FI configured in FC switching mode.

5. The method of claim 1, wherein the internal storage element comprises a storage array attached via a SAN switch to the UCS through an E-port of a FI configured in FC switching mode.

6. The method of claim 1, wherein the internal VSAN and the external VSAN are distinguished from each other by distinct VSAN identifiers (IDs).

7. The method of claim 1, wherein generating the configuration settings for the initiator comprises creating appropriate Network Interfaces (NICs) at the initiator to facilitate logical unit numbers (LUNs) of the one or more targets appearing as local disks at the initiator.

8. The method of claim 1, wherein generating the configuration settings for the one or more targets comprises configuring target ports, disk groups, volumes, LUNs and LUN mappings on the one or more targets.

9. The method of claim 1, wherein generating the FC services comprises:
  retrieving initiator-to-target connectivity requirements for internal storage elements using worldwide names of the initiator and the one or more targets;
  computing FC zone sets, FC zones and FC zone members without user intervention;
  performing UCS manager-managed zoning on the internal VSAN; and
  facilitating fabric-based zoning on the external VSAN.

10. Non-transitory media encoding logic that includes instructions for execution, which when executed by a processor is operable to perform operations, comprising:
  partitioning a SAN into an internal VSAN for connectivity to an internal storage element, wherein a first portion of the SAN is implemented in a UCS and a second portion of the SAN is external to the UCS, wherein the internal storage element is located in the first portion of the SAN;
  partitioning the SAN into an external VSAN for connectivity to an external storage element located in the second portion of the SAN; and
  facilitating communication with the internal storage element over the internal VSAN and with the external storage element over the external VSAN;
  wherein the operations further comprise:
  receiving storage requirements associated with an initiator and one or more targets in the SAN;
  generating configuration settings for the initiator, and the one or more targets; and
  generating FC services in a FI of the UCS.

11. The media of claim 10, wherein border ports on a FI in FC switching mode are configured as N-ports for the external VSAN, wherein the external storage element comprises a storage array attached via a SAN switch to the UCS through one of the N-ports.

12. The media of claim 10, wherein the internal storage element comprises a storage blade attached to the UCS through a vFC interface of a FI configured in FC switching mode.

13. The media of claim 10, wherein generating the FC services comprises:
  retrieving initiator-to-target connectivity requirements for internal storage elements using WWNs of the initiator and the one or more targets;
  computing FC zone sets, FC zones and FC zone members without user intervention;
  performing UCS manager-managed zoning on the internal VSAN; and
  facilitating fabric-based zoning on the external VSAN.

14. An apparatus, comprising:
  a memory element for storing data; and
  a processor that executes instructions associated with the data, wherein the processor and the memory element cooperate such that the apparatus is configured for:
    partitioning a SAN into an internal VSAN for connectivity to an internal storage element, wherein a first portion of the SAN is implemented in a UCS and a second portion of the SAN is external to the UCS, wherein the internal storage element is located in the first portion of the SAN;
    partitioning the SAN into an external VSAN for connectivity to an external storage element located in the second portion of the SAN; and
    facilitating communication with the internal storage element over the internal VSAN and with the external storage element over the external VSAN;
  wherein the apparatus is further configured for:
  receiving storage requirements associated with an initiator and one or more targets in the SAN;
  generating configuration settings for the initiator, and the one or more targets; and
  generating FC services in a FI of the UCS.

15. The apparatus of claim 14, wherein border ports on a FI in FC switching mode are configured as N-ports for the external VSAN, wherein the external storage element comprises a storage array attached via a SAN switch to the UCS through one of the N-ports.

16. The apparatus of claim 14, wherein the internal storage element comprises a storage blade attached to the UCS through a vFC interface of a FI configured in a FC switching mode.

17. The apparatus of claim 14, wherein generating the FC services comprises:
  retrieving initiator-to-target connectivity requirements for internal storage elements using WWNs of the initiator and the one or more targets;
  computing FC zone sets, FC zones and FC zone members without user intervention;
  performing UCS manager-managed zoning on the internal VSAN; and
  facilitating fabric-based zoning on the external VSAN.

* * * * *